Figure 1:
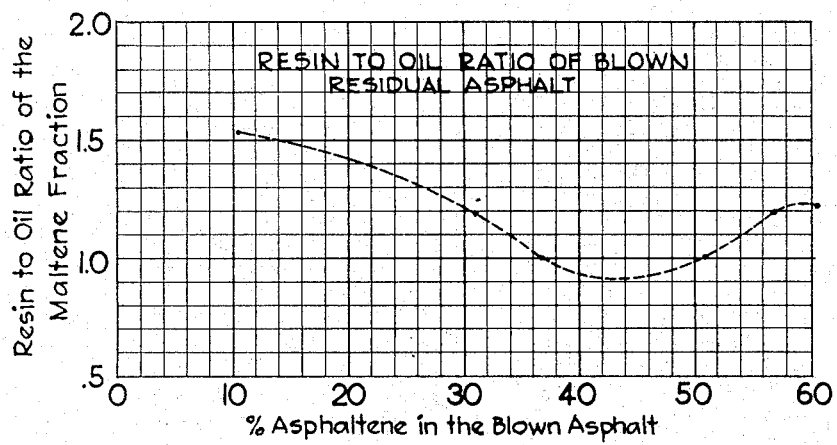
Figure 2:
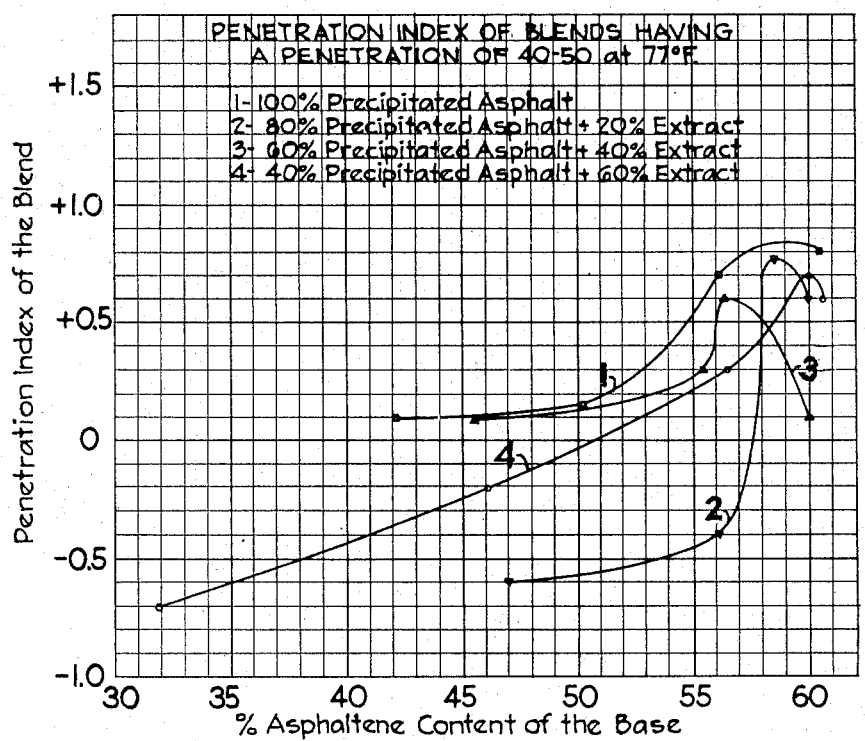

April 20, 1943.  L. L. LOVELL ET AL  2,317,150

ASPHALT MANUFACTURE

Filed May 12, 1941

Inventors: Lawrence L. Lovell
Donald C. Isted
Roman Leo Ortynsky

By their Attorney:

Patented Apr. 20, 1943

2,317,150

UNITED STATES PATENT OFFICE 2,317,150

ASPHALT MANUFACTURE

Lawrence L. Lovell and Donald C. Isted, Wood River, and Roman Leo Ortynsky, Alton, Ill., assignors to Shell Development Company, San Francisco, Calif., a corporation of Delaware Application May 12, 1941, Serial No. 393,002

10 Claims. (Cl. 196—74)

This invention relates to the art of manufacturing asphalts for paving purposes, and, more especially, to the manufacture of asphalts by blowing and blending bitumens from certain sources.

It is generally considered that asphalts consist of three main constituents, namely, asphaltenes, resins and oils. Standard methods of determining these constituents comprise precipitation of asphaltenes by a large volume of 86° Bé. naphtha, absorption of resins with a large amount of silica gel, etc. Portions of the asphalt, often called maltenes, which are soluble in naphtha consist essentially of oils and resins.

Asphalts contained in asphaltic crudes may be separated from the other components either by distillation or by precipitation. The former process produces so-called residual asphalts, the latter precipitated asphalts.

The distillation is, in general, conducted in the presence of steam and occasionally under vacuum to avoid too high temperatures which may result in cracking.

Precipitated asphalts are, in general, obtained from asphaltic crudes that have been freed of their lightest components by distillation. Such topped crudes are treated with suitable asphalt precipitants, that is, liquids having preferential solvent power for the non-asphaltic portions of the crudes and no appreciable solvent power for the asphalts. The asphalt is thus precipitated and can be separated for further treatment. Many such precipitants are known, such as paraffinic hydrocarbons of six and less carbon atoms like light naphtha or casinghead gasoline, natural gas, methane, ethane, propane and butane, under conditions such that they are, or behave like, liquids. Certain alcohols, ethers and acetone may also be used alone or in admixture with the above paraffinic hydrocarbons. By varying the nature of the solvent, its proportions, temperature, pressure and other factors, it is possible to vary the properties of precipitated asphalts, as is well known in the art.

The quality of asphalt used in the construction of highways is estimated mainly on the basis of its physical properties such as viscosity or hardness, ductility, temperature susceptibility and fluidity factor.

The most valuable asphalts are those obtained from certain Mexican crudes, such as Panuco crude, which possess low temperature susceptibilities and high ductilities for a given hardness. Asphalts from other sources are, in general, inferior in one or both qualities. A very simple and practical way of estimating the temperature susceptibility of an asphalt is the "penetration index," explained and defined by Pfeiffer and Van Doormal in the National Petroleum News of February 23, 1938, pages R–78 to R–84. The higher the penetration index, the lower the temperature susceptibility of the asphalt and the more valuable it is.

Several methods of improving the penetration index of a given asphalt are known such as oxidation by blowing with air at high temperatures, treating with chlorine or other oxidation agents, blending it with blown asphalt, etc. Either residual or precipitated asphalt may be oxidized.

The penetration index takes into account only the behavior of an asphalt up to the melting point. The viscosity above the melting point is accounted for by the fluidity factor which, as defined in U. S. Patent 2,223,776, is $$\text{Fluidity factor} = (V - F) \frac{P}{100}$$

where $V$=viscosity in seconds Saybolt furol at 275° F., and $P$=penetration at 77° F., 100 grams, 5 seconds. For asphalts having same penetration at 77° F. the fluidity factor increases with their viscosity at 275° F.

The desirable physical properties of asphalts depend largely upon the proper balance of their different constituents and on their properties. For example, residual oils, whose resin content is first increased on oxidation and then as the oxidation progresses their ratio of resin to oily constituents is decreased, are said to give blends of improved temperature susceptibilities.

To diminish the hardness of an asphalt it is known to blend it with fluxes. In defining this invention we use the term "flux" exclusively in the sense of "blending flux" designating liquids or plastics of lower softening point than the asphalt, and compatible with it. We expressly exclude the sense of "blowing flux" sometimes encountered which designates any asphaltic substance subjected to blowing. Thus, fluxes in accordance with our definition may be, for example, asphaltic crudes which may be topped, cracked residues, black fuel oils and road oils, etc.; or asphalt-free straight run or cracked heavy distillates, gas oils, lubricating oils; or aromatic extracts from various hydrocarbon oils obtained by means of a selective solvent having preferential solvent power for aromatic hydrocarbons or mixtures containing them; etc. Extracts, as is known, may be obtained, for example, by extracting topped crudes, bright stocks, lubricating or gas oils with liquid SO₂, nitrobenzene, methyl acetate, phenyl acetate, methyl or ethyl cellosolve, furfural, acetone, aniline, phenol, cresylic acids, dichlordiethyl ether, SO₂-benzene mixtures or other selective solvents, or with a combination of solvent and anti-solvent such as phenol or cresol with propane, etc.

It is an object of this invention to produce an improved asphalt which is applicable for various purposes as such, or emulsified, or diluted to a cutback asphalt. Other objects are to produce an asphalt having an improved penetration index and to simplify manufacturing procedures. Still other objects will be apparent from the following description.

This invention is based on the discovery that blended asphalts produced with certain precipitated asphalt are greatly improved when the latter is highly blown and thereafter is blended with a suitable flux to the required specification. It was found necessary, in order to obtain the improved results, to oxidize the precipitated asphalt to a high asphaltene content of 45% to 65%.

Precipitated asphalts used in this invention are obtained from short residues having viscosities above about 300 S. S. U. at 210° F. and, if properly freed from volatile components, have flash points above 500° F. Precipitated asphalts from such residues are, in general, hard and, for the purpose of this invention, an asphalt having a penetration at 77° F. of 10 or less is preferred. When obtained from Mid-Continent and similar crudes such precipitated asphalts have, in general, asphaltene contents below about 20%, e. g. about 8% to 20%, and resin contents between about 40% and 65% or more. They may be blown alone or in admixture with up to about 60% (calculated on the mixture) of a heavy aromatic extract which at ordinary room temperatures has a consistency measurable by an A. S. T. M. needle penetrometer. Such normally non-fluid extracts contain substantial amounts of resins, normally above 30% and, for reasons explained below, are preferred to easily flowing extracts which contain relatively small amounts of resins or none at all. Thus, a suitable extract to be mixed with the precipitated asphalt prior to blowing is, for example, that obtained by the Duo-sol process from a dewaxed bright stock which, in turn, may have been derived from the same short residue as the precipitated asphalt after dewaxing. A typical bright stock extract of this type was found to have a gravity below 10° A. P. I. and an A. S. T. M. needle penetration at 77° F. of 70 to 80.

Oxidation of the hard precipitated asphalt is carried out by conventional means, for example, by blowing with air at 450° F. to 500° F. until the desired asphaltene content of 45% to 65%, and preferably 55% to 60%, is reached. Maintenance of this temperature range, although not novel in itself, is desirable for best results when oxidizing blends of precipitated asphalts by blowing. If the blowing temperature differs appreciably from the above limits, difficulty in obtaining proper dispersion of asphaltenes is liable to occur. It further appears that it is the very high resin content in conjunction with relatively low oil content of the blowing stock which makes it possible to reach such high contents of asphaltenes which are readily dispersable in fluxes. Therefore, it is highly desirable that the blowing stocks, i. e. the precipitated asphalts which may contain added bright stock extracts, have resin contents of at least 40%.

The blown mixture, having an asphaltene content of at least 45%, is then blended with a suitable flux to produce the desired asphalt.

Suitable fluxes, which give a complete and stable dispersion with the asphaltenes of the highly oxidized asphalt, must have a high dispersing power for asphaltenes which may be due either to a high aromaticity such as possessed by aromatic extracts, or to the presence of protective colloids such as are present in residual asphalts, or to both factors. The blends thus obtained are homogeneous and have a negative Oliensis test.

For example, several grades of high quality paving asphalt were obtained by blending a residual asphalt, having an asphaltene content of 5% to 10% and a softening point of 85° F., obtained from a Hendricks crude with a highly blown precipitated asphalt obtained in accordance with the above. Very good cutback asphalt bases were produced by blending normally liquid extracts having viscosities of 66 to 250 S. S. U. at 210° F. obtained from lubricating oils.

When making paving asphalts residual asphaltic fluxes are usually preferred, in which case from 97 to 50, and preferably 95 to 60, parts of the flux are blended with the oxidized asphalt to give 100 parts of the blend. When producing cutbacks, extracts are preferred for fluxing between 25 to 50, and preferably 30 to 40, parts of flux normally being commingled with the oxidized asphalt to produce 100 parts of the cutback base.

It has also been found that, when using a flux consisting of a mixture of heavy extract and a lubricating oil distillate, it is possible by changing the ratio of the two constituents to obtain useful variations in the properties of the asphalt. An increase in the proportion of extract increases the ductility of the blend, while increasing the proportion of the distillate raises its fluidity factor. Thus, by varying the proportions of the three constituents, asphalts having desired penetration, penetration index, ductility and fluidity factors can be prepared.

The following considerations may aid in making understood the nature of this invention.

When the precipitated asphalt is oxidized, as by blowing at the temperature indicated, its asphaltene content increases continuously. In the early stages of blowing, the asphaltene content increases rapidly and the resin content falls off. Blends prepared with this lightly blown asphalt and straight run residual asphalts show the usual properties and relatively low penetration indices.

However, when the blowing is continued the results are quite different. The asphaltene content increases more slowly than in the early stages of blowing, and the oil content decreases while the resin content of the asphalt remains almost constant. This seems to indicate that the asphaltenes are formed more at the expense of the oily constituents, while in the early stages they are formed more at the expense of the resins. Blends of the resulting highly oxidized asphalts with suitable fluxes show a markedly improved temperature susceptibility; that is, a higher penetration index, provided the fluxes are capable of properly dispersing the asphaltenes.

The accompanying drawing illustrates these facts.

Figure I is a graph which represents the change in the resin-to-oil ratio of the maltene fraction of an asphalt precipitated from a Mid-Continent short residue when the asphaltene content of the asphalt is increased by blowing. It can be seen that in the early stages of oxidation, the resins are more rapidly depleted than the oily constituents, while later the reverse is true. This indicates that the character of the process is quite different for mild and for severe oxidation, and the resin content at the end of the oxidation is normally over 20%.

Figure II is a graph wherein the penetration index of blended asphalts is plotted against the asphaltene contents of various oxidized precipitated asphalt bases used to produce the blends, the latter having A. S. T. M. penetrations of 40 to 50 at 77° F. Four curves are shown, each representing blends derived from a different base asphalt:

| Curve | Bases subjected to oxidation |
|---|---|
| 1 | 100% precipitated asphalt. |
| 2 | 80% precipitated asphalt and 20% bright stock extract. |
| 3 | 60% precipitated asphalt and 40% bright stock extract. |
| 4 | 40% precipitated asphalt and 60% bright stock extract. |

Oxidation to the various asphaltene contents was obtained by blowing the bases with air at 450° F. to 500° F., and the resulting products were then blended with asphaltic residue from Hendricks crude.

These curves show that highly oxidized asphalts form blends having a better temperature susceptibility than more lightly oxidized asphalts. While in these particular blends shown, asphaltene contents of the base of about 55% to 65% produce the highest penetration indices, certain other blends possess maximum penetration indices at lower asphaltene contents of the base, i. e. between 45% and 55%.

We claim as our invention:

1. In the process of manufacturing asphalts wherein a precipitated asphalt is oxidized and blended with a flux, the improvement comprising blowing with air as the sole oxidizing agent a precipitated asphalt to produce a blown asphalt having an asphaltene content of 45% to 65%, said precipitated asphalt having an asphaltene content under 20% and a resin content over 40%, and being obtained from a crude oil short residue having a viscosity over 300 S. S. U. at 210° F., and blending said blown asphalt with a flux having a high dispersing power for asphaltenes.

2. The process of claim 1 wherein the blowing is carried out at a temperature of 450° F. to 500° F.

3. The process according to claim 1 wherein the flux is a residual asphalt having 5% to 10% asphaltenes.

4. The process according to claim 1 wherein the flux is a normally liquid lubricating oil extract.

5. The process according to claim 1 wherein the flux is prepared by blending an aromatic lubricating oil extract with a lubricating oil distillate.

6. The process of claim 1 wherein the blown precipitated asphalt is blown to an asphaltene content of 55% to 60%.

7. The process of claim 1 wherein the blown asphalt has a resin content of over 20%.

8. In the process of manufacturing asphalts wherein a precipitated asphalt is oxidized and blended with a flux, the improvement comprising mixing a precipitated asphalt obtained from a short crude oil residue having a viscosity over 300 S. S. U. at 210° F. with up to 60% (calculated on the resulting mixture) of an aromatic extract having a consistency measurable with the A. S. T. M. asphalt penetrometer, said mixture having an asphaltene content under 20% and a resin content over 40%; oxidizing said mixture by blowing with air as the sole oxidizing agent to an asphaltene content of 45% to 65% and blending the oxidized product with a flux having a high dispersing power for asphaltenes.

9. A homogeneous asphalt composition having a negative Oliensis test comprising a precipitated asphalt oxidized by blowing with air as the sole oxidizing agent and a flux having a high dispersing power for asphaltenes, said precipitated asphalt originally containing over 40% resins and under 20% asphaltenes, and said oxidized precipitated asphalt containing 45-65% asphaltenes and more than 20% resins.

10. A homogeneous asphalt composition, having a negative Oliensis test, comprising a mixture oxidized by blowing with air as the sole oxidizing agent and a flux having a high dispersing power for asphaltenes, said mixture originally containing not less than 40% resins and consisting of a precipitated asphalt and up to 60% of an aromatic extract having a consistency measurable by the A. S. T. M. needle penetrometer, said precipitated asphalt having an asphaltene content of less than 20%, and said mixture, when oxidized, containing 45% to 65% asphaltenes.

LAWRENCE L. LOVELL.
DONALD C. ISTED.
ROMAN LEO ORTYNSKY.